P & P. J. SCHMITT.
Seed Dropper.

No. 61,879.

Patented Feb. 5, 1867.

United States Patent Office.

PETER AND PETER JACOB SCHMITT, OF WATERLOO, ILLINOIS.

*Letters Patent No. 61,879, dated February 5, 1867.*

---

IMPROVEMENT IN GRAIN DRILLS.

---

The Schedule referred to in these Letters Patent and making part of the same.

---

TO ALL WHOM IT MAY CONCERN:

Be it known that we, PETER SCHMITT and PETER JACOB SCHMITT, of Waterloo, in the county of Monroe, and State of Illinois, have invented a new and improved Grain Drill; and we do hereby declare that the following is a full, clear, and exact description thereof, which will enable others skilled in the art to make and use the same, reference being had to the accompanying drawings, forming part of this specification.

This invention relates to certain improvements on our grain drill, Letters Patent for which were granted to us on the 24th day of April, 1866.

The improvements consist in the construction and arrangement of the longitudinal shaft which is placed into the seed-box, said shaft being provided with blocks by which the holes in the bottom of the seed-box are alternately closed and opened, whereby the feed is made regular and equal, and is not affected by the jars and jolts of the machine. To each of these blocks are secured one or more metal pins, whereby the grain is well stirred and fed to the seed-holes, and whereby the latter are also kept clear from obstructions. The crank or arm, which is attached to one end of this feed-bar, and which is connected by a pitman with a crank on a shaft that gears into a toothed wheel on the axle of the machine, is slotted, so that the said pitman may be secured further from or nearer to the feed-bar, thus increasing or reducing the motion of the said feed-bar as may be desired. Underneath the seed-box, and connected with the lower slide-bar, we have arranged a lever, which is, at its end, provided with a slot, wherein the lever of the shoe-lifting bar works, so that as the shoes are lowered the said lever will close the seed-holes automatically, and *vice versa*. The upper seed-slide only is connected by a lever to the horizontal wheel; the latter is now operated by hand, not automatically, as in our first patent. The wheel is connected with a pointer working over a graduated index, whereby the amount to be sown may be regulated with accuracy. A set-screw serves to secure the wheel in any desired position after the feed-holes are regulated. In the annexed drawings, our improvements are designated—

Figure 1 being a vertical longitudinal section of the seed-box, taken on the line $x\,x$, fig. 2.

Figure 6 is a detail side view of the slotted arm or crank, which is attached to one end of the seed-bar.

Similar letters of reference indicate like parts.

Figure 4:
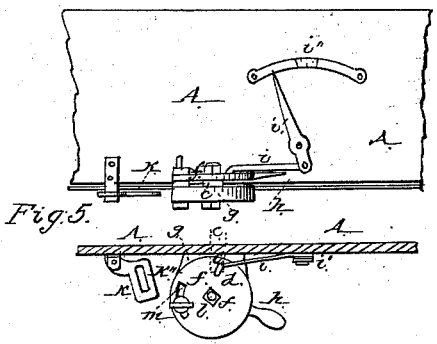
Figure 4 is a portion of a side elevation of the same.
Figure 3:
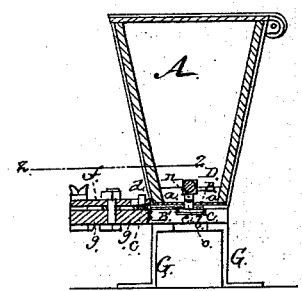
Figure 3 is a vertical cross-section of the same, taken on the line $y\,y$, fig. 1.
Figure 5:
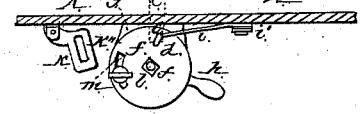
Figure 5 is a detail horizontal sectional view, taken in the line $z\,z$, fig. 3.
Figure 1:
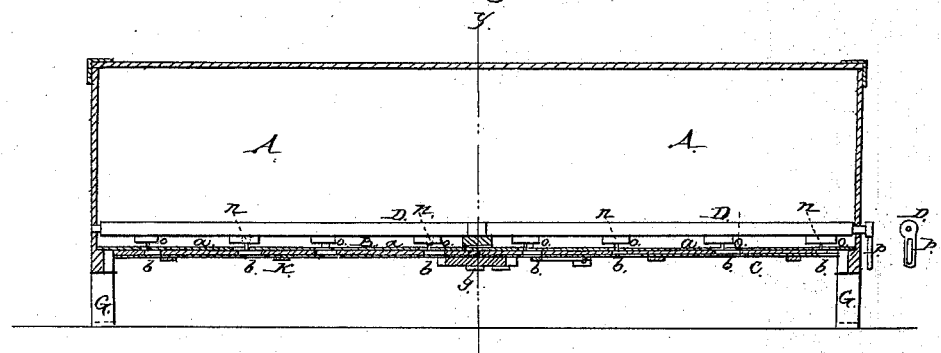
Figure 2:
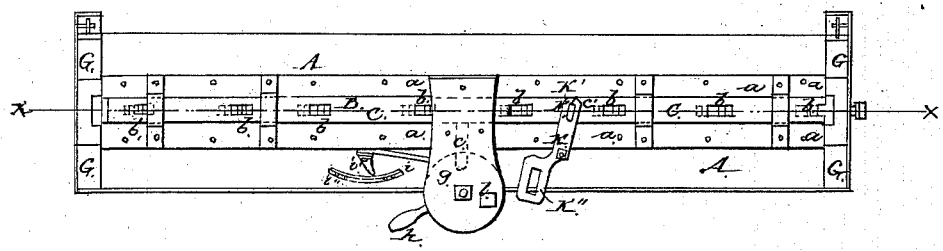
Figure 2 is a bottom plane view of the same.

The seed-box A, which is constructed as described in our first patent, and which is secured to a similar frame, as therein set forth, by means of upright standards G, is provided with a perforated bottom, $a$, below which two bars B C are placed, one above the other, each perforated with holes, $b$, and each extending from end to end of the seed-box. The upper bar B has a lever $c$ secured to it, which is provided with a vertical pin, $d$; the latter is fitted in a slot cut into a horizontal wheel, $f$, which is pivoted to an arm, $g$, extending from the bottom of the seed-box. The wheel $f$ is provided with a handle, $h$, so that by turning it by hand the seed-holes may be more or less opened. A rod, $i$, extends from the wheel $f$ to a hand or pointer, $i'$, to which it is attached below its pivoting point, as seen in fig. 4. The hand $i'$ is pivoted to the side of the seed-box, and as the wheel $f$ is turned the hand will point to a graduated index, $i''$, which is also secured to the seed-box, as seen in fig. 4. The flow of the grain from the seed-box is automatically stopped or started by means of a lever, K, which is attached to the under side of the seed-box, (see fig. 2,) and which is provided with an oblong slot, K', at its inner end, which fits around a pin, $c'$, on the lower bar C. The outer end K'' of the lever K is also slotted, as shown in fig. 2. This slotted end K'' is secured by a joint to the shoe-lifting bar in a similar manner, as shown in our former Letters Patent. A thumb-screw, $l$, which is secured to the arm $g$, and passes through a circular slot, $m$, in the wheel $f$, serves to secure that wheel, and with it the upper bar B, in any desired position. Above each hole in the bottom of the seed-box A is secured to the shaft D, which is placed longitudinally within the said seed-box, a block, $n$, which may be made of metal or wood, as desired. To each block or valve $n$ is secured a pin, $o$, which is made of steel or other suitable metal, and which acts as a stirrer, as before set forth. More than one pin $o$ may be attached to each block or valve $n$. The crank or arm $p$, which is attached to the end of the bar D, as seen in fig. 1, is provided with an oblong slot, as shown in fig. 6, for the purpose of regulating the motion of the bar D, as set forth.

Having thus described our invention, what we claim as new, and desire to secure by Letters Patent, is—

1. The metal or wooden blocks or valves $n$, which are secured to the feed-bar D, and the pins $o$, which are attached to the blocks $n$, substantially as and for the purpose herein shown and described.

2. The slotted crank $p$ of the feed-bar D, operating substantially as and for the purpose herein shown and described.

3. The slotted lever K, which is pivoted to the seed-box A, and whereby the flow of the seed may be automatically regulated, substantially as herein shown and described.

4. The thumb-screw $l$, in combination with the slot $m$ in the wheel $f$, for the purpose of securing the bar B in any desired position, substantially as herein shown and described.

5. The hand $i'$ and index $i''$, in combination with the rod $i$, wheel $f$, and handle $h$, all made and operating substantially as herein shown and described.

PETER SCHMITT,
PETER J. SCHMITT.

Witnesses:
CHARLES HENCKLER,
PHILIPP PALM.